United States Patent
Cadix et al.

(10) Patent No.: US 10,815,413 B2
(45) Date of Patent: Oct. 27, 2020

(54) TREATMENT OF UNDERGROUND FORMATIONS WITH GELS

(71) Applicant: RHODIA OPERATIONS, Paris (FR)

(72) Inventors: Arnaud Cadix, Saint Ouen (FR); Chi-Thanh Vuong, Lognes (FR)

(73) Assignee: RHODIA OPERATIONS, Aubervilliers (FR)

(*) Notice: Subject to any disclaimer, the term of this patent is extended or adjusted under 35 U.S.C. 154(b) by 0 days.

(21) Appl. No.: 14/394,886

(22) PCT Filed: Apr. 18, 2013

(86) PCT No.: PCT/EP2013/058051
§ 371 (c)(1),
(2) Date: Oct. 16, 2014

(87) PCT Pub. No.: WO2013/156551
PCT Pub. Date: Oct. 24, 2013

(65) Prior Publication Data
US 2015/0087565 A1    Mar. 26, 2015

(30) Foreign Application Priority Data
Apr. 18, 2012 (FR) .................................... 12 01145

(51) Int. Cl.
*C09K 8/42* (2006.01)
*C08J 3/075* (2006.01)
(Continued)

(52) U.S. Cl.
CPC .............. *C09K 8/426* (2013.01); *C08J 3/075* (2013.01); *C09K 8/44* (2013.01); *C09K 8/5083* (2013.01);
(Continued)

(58) Field of Classification Search
CPC .... C09K 8/426; C09K 8/5083; C09K 8/5753; E21B 33/138; C08J 3/075
(Continued)

(56) References Cited

U.S. PATENT DOCUMENTS 3,366,584 A * 1/1968 Zimmerman .................. 524/523
5,341,878 A * 8/1994 Osterloh .................. C09K 8/58
166/270.1
(Continued)

FOREIGN PATENT DOCUMENTS

BE           672295 A      5/1966
CN       101885591 A     11/2010
(Continued)

*Primary Examiner* — Aiqun Li

(57) ABSTRACT

The present invention relates to the formation of a gel within a medium M, in particular within an underground formation, which comprises the following steps: (EI) a basic compound C is added to a fluid latex L comprising dispersed particles of a polymer P, bearing ester side functions, said basic compound C being added in an amount suitable for hydrolysing at least one part of said ester side functions into carboxylic acid and/or alcohol functions, as a result of which a modified latex L' is obtained, the viscosity of which gradually increases with time from the addition of the compound C up to the formation of a gel; then (E2) the resulting modified latex is introduced into the medium M before the formation of the gel and the gel is left to form within the medium M.

22 Claims, 1 Drawing Sheet

(51) Int. Cl.
*C09K 8/575* (2006.01)
*C09K 8/508* (2006.01)
*E21B 33/138* (2006.01)
*C09K 8/44* (2006.01)

(52) U.S. Cl.
CPC .......... *C09K 8/5753* (2013.01); *E21B 33/138* (2013.01); *C08J 2333/02* (2013.01); *C08J 2333/04* (2013.01); *C08J 2333/08* (2013.01); *C08J 2333/10* (2013.01); *C08J 2333/14* (2013.01)

(58) Field of Classification Search
USPC .......................................................... 507/224
See application file for complete search history.

(56) References Cited

U.S. PATENT DOCUMENTS

| | | | |
|---|---|---|---|
| 5,703,176 A | 12/1997 | Ungefug et al. | |
| 6,138,760 A * | 10/2000 | Lopez | C09K 8/52 166/280.1 |
| 6,346,588 B1 * | 2/2002 | Fenchl et al. | 526/218.1 |
| 8,883,262 B2 | 11/2014 | Bendejaq et al. | |
| 9,080,043 B2 | 7/2015 | Yuan-Huffman et al. | |
| 9,125,808 B2 | 9/2015 | Alli et al. | |
| 2008/0045420 A1 * | 2/2008 | Karagianni | C08F 246/00 507/121 |
| 2008/0125334 A1 * | 5/2008 | Burns | C09K 8/512 507/219 |
| 2010/0093874 A1 * | 4/2010 | Monin | C08F 220/38 514/772.4 |
| 2013/0090391 A1 * | 4/2013 | Tan | A23L 2/52 514/781 |

FOREIGN PATENT DOCUMENTS

| | | |
|---|---|---|
| EP | 0350548 A1 | 1/1990 |
| GB | 1458662 A1 | 12/1976 |
| SU | 492645 A1 | 11/1975 |
| SU | 1444448 A1 | 12/1988 |
| WO | WO 2004/067470 A1 | 8/2004 |

* cited by examiner

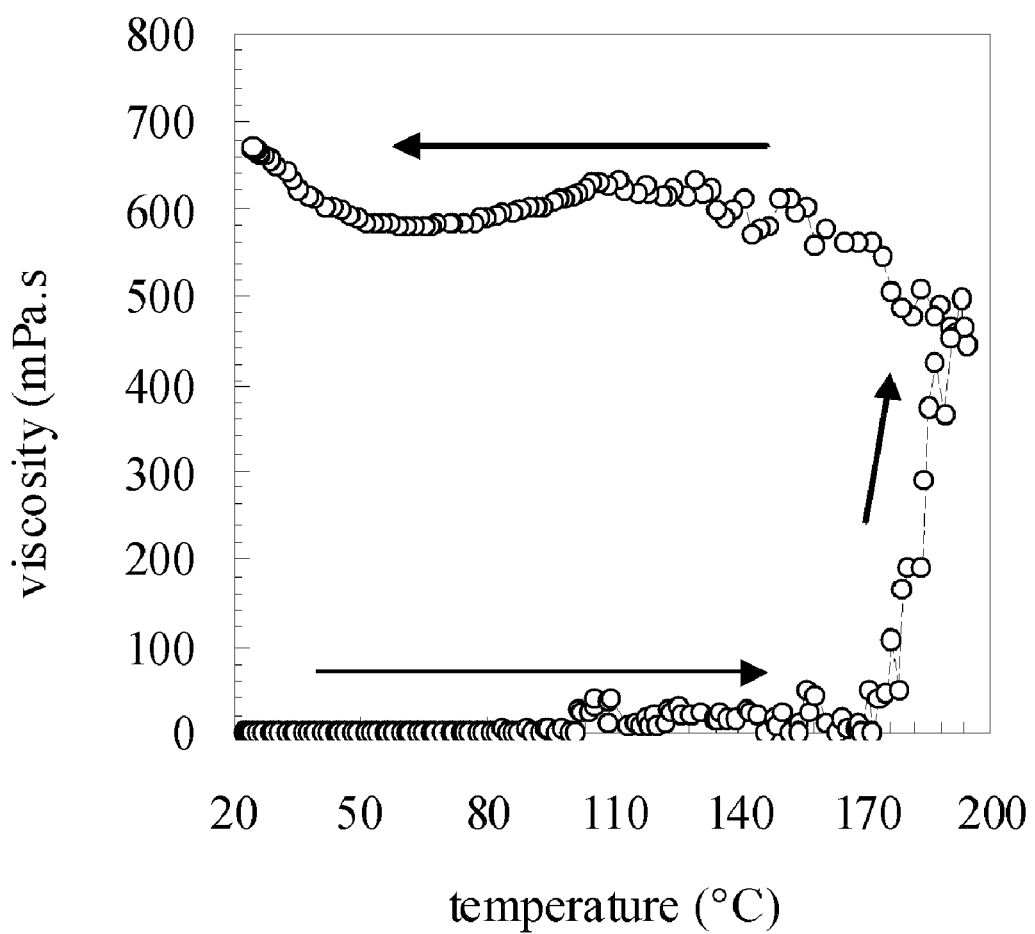

TREATMENT OF UNDERGROUND FORMATIONS WITH GELS

CROSS-REFERENCE TO RELATED APPLICATIONS

The present application is a U.S. national stage entry under 35 U.S.C. § 371 of International Application No. PCT/EP2013/058051 filed Apr. 18, 2013, which claims priority to FR Application No. 12.01145 filed on Apr. 18, 2012, the whole content of this application being herein incorporated by reference for all purposes.

TECHNICAL FIELD OF THE INVENTION

The present invention relates to a method for inhibiting the passage of liquid or gas, in an isolated and reversible manner, through cavities, excavations, cracks and/or fissures within underground formations, and which is in particular suitable for temporarily sealing off wells drilled in a hydrocarbon-comprising reservoir. This method uses a liquid composition which can be pumped and injected in liquid form within a well or more generally within an underground formation, and which subsequently forms a gel that is stable at high temperature within the underground formation.

BACKGROUND OF THE INVENTION

Various techniques have been proposed which aim to provide a treatment for wells or underground formations of the abovementioned type. The aim of these techniques is to form gelled plugs. To cite just one particular application among the possible uses of these plugs, they may, for example, be used to temporarily isolate a zone of a drilling well or of any other zone of an underground formation with respect to gases and liquids, to cite just one particular application.

The use of a composition of modified polysaccharides, which are fluid when they are injected and the viscosity of which then gradually increases within the underground formation where there are injected, has in particular been proposed. These compositions, which typically comprise polysaccharides of guar or cellulose type, modified with ethylene carbonate groups which gradually hydrolyze in an aqueous medium, have the drawback of being able to be used only at relatively low temperatures, typically below 120° C., which constitutes an impediment to their use in a number of wells or underground formations where it is not uncommon for the exploitation conditions to generate temperatures exceeding 150° C., or even 200° C.

One objective of the present invention is to provide a method suitable for the reversible formation, within an underground formation, of plugs of the abovementioned type, which make it possible to inhibit the passage of liquid and/or gas, at temperatures of 150° C. or more, these plugs preferably remaining stable at these temperatures, that is to say which are suitable for providing an isolating effect with respect to liquids and/or gases for a period of at least 7 days, preferably for at least 10 days.

SUMMARY OF THE INVENTION

To this effect, the present invention proposes injecting, within a medium where it is desired to form a gel, a latex composition of a particular polymer, namely a polymer bearing pendant ester functions, to which is added, just before injection, a basic compound (base) suitable for inducing gradual hydrolysis of at least one part of these pendant ester functions into carboxylic acid and/or alcohol functions, thereby inducing a gradual transformation of the latex, which is initially fluid, into a composition of gel type, with a gradual increase in viscosity, making it possible, at the start, to easily handle the composition, in particular to pump it and to inject it, and ultimately to provide the desired plug formation.

More specifically, according to a first aspect, the subject of the present invention is a process for forming a gel within a medium M (such as an oil well, an oil-bearing rock or any other underground formation), which comprises the following steps:

(E1) a basic compound C is added to a fluid latex L comprising dispersed particles of a polymer P, bearing ester side functions, said basic compound C being added in an amount suitable for hydrolyzing at least one part of said ester side functions into carboxylic acid and/or alcohol functions, as a result of which a modified latex L' is obtained, the viscosity of which gradually increases with time from the addition of the compound C up to the formation of a gel, in particular by raising the temperature; then (E2) the resulting modified latex is introduced into the medium M before the formation of the gel and the gel is left to form within the medium M.

According to another aspect, the subject of the invention is a kit for carrying out the abovementioned steps (E1) and (E2), which comprises:
- at least one first container containing a fluid latex L as defined above;
- at least one second container, distinct from the first, containing a basic compound C of the type described above, to be added to the latex L so as to form the modified latex L' for the formation of a gel according to step (E2).

The term "polymer bearing ester side functions" is intended to mean a polymer comprising:
  (i) a backbone not interrupted with ester functions; and
  (ii) borne by this backbone, identical or distinct ester functions, of formula —COOR and/or —O—(C=O)—R, where each of the R groups on each of the ester functions present on the polymer is, independently, a totally or partially cyclized or noncyclic, saturated or unsaturated, linear or branched hydrocarbon-based chain optionally interrupted with one or more heteroatoms (in particular S, O, N or Si), it being possible for the R group to be optionally halogenated, or even perhalogenated. Typically, the R group is an alkyl group comprising from 1 to 6 carbon atoms, in particular a methyl, ethyl, propyl, n-propyl, butyl, isobutyl or tert-butyl group.

The studies carried out by the inventors in the context of the present invention have now made it possible to demonstrate that the implementation of steps (E1) and (E2) makes it possible to obtain, very simply and directly, the formation of a gel with a delay effect sufficient to allow the injection of the forming gel within any type of medium M (porous or fractured underground formation, oil well, or any type of porous medium u exhibiting cavities) and the formation of the gel within a targeted zone of this medium, including in the zones requiring a sizable injection time (the gelling of the latex L occurs gradually, with a viscosity which remains sufficiently low initially to allow easy migration of the latex to a selected zone). In addition, it is possible to regulate the speed of formation of the gel according to the intended applications for the gel, in particular by modulating the composition of the polymer. In particular, the speed of formation of the gel can be reduced by introducing gelling groups which are described in greater detail hereinafter.

Moreover, it turns out that steps (E1) and (E2) result in the formation of gels which have high thermal stabilities. Thus, a gel as obtained at the end of step (E2) is generally suitable for providing long-lasting (typically for at least 7 days, or even at least 10 days) isolation with respect to liquids or gases at temperatures above 150° C., which is particularly advantageous in comparison with the stabilities obtained with the modified polysaccharides described above in the present description. Thus, according to one embodiment of the invention that can be envisioned, all or part of step (E2) is carried out at a temperature above or equal to 150° C., or even above 200° C., for example between 150 and 250° C., and/or the gel formed in step (E2) is used in these temperature ranges.

In addition, the gels obtained according to steps (E1) and (E2) have a high mechanical strength. This mechanical strength varies according to the exact composition of the polymers used, but the gel typically has an elasticity greater than or equal to 1000 Pa (typically about 500 lbs/100 sq ft). Nevertheless, the plug formed from a gel prepared according to the invention is reversible and it can be easily removed, in particular by applying thereto a sufficiently large mechanical stress or by attacking it chemically (strong base, strong acid, oxidizing agent, etc). Thus, a gel as obtained according to the invention can typically be used to reversibly form a plug within a medium M which is an underground formation, in particular within an oil well.

Another advantage of the process of the invention is that it can be carried out in various chemical environments, for example in contact with brines having a high salt concentration or else with extraction fluids.

Moreover, in addition to the fact that steps (E1) and (E2) are very easy to carry out, they can be performed with a low cost, compatible with them being carried out on an industrial scale. Typically, steps (E1) and (E2) can be very easily carried out by an operator on a site where it is desired to produce the gel from the latex L. The latex L is a liquid that is very easy to transport and to handle, as is the basic compound C. These two compounds can be stored for considerable periods of time (typically at least one year) and transported, unmixed (advantageously in the form of the abovementioned kit), to the site of use, the increase in viscosity of the latex beginning only when the basic compound C is introduced into the latex L and not beforehand. During the implementation of step (E2) at high temperature within the medium M, the increase in the viscosity accelerates when the speed increases, but the formation of the gel remains confined in the medium M. Thus, when carrying out the process of the invention, the operator only has to perform a very simple mixing and then to introduce the mixture obtained into the medium M where it is desired to form the gel, which is very easy to do since the mixture is fluid and very easy to pump and inject. The invention thus makes it possible to obtain the advantages of a gel within the medium M, while dispensing with the drawbacks of a gel (in particular the difficulties associated with handling it) before and during the introduction into the medium.

For all these reasons, the method proposed according to the invention proves to be a particularly advantageous, practical and effective means of producing a gel within any type of medium, in particular within an underground formation or an oil well.

BRIEF DESCRIPTION OF THE DRAWING

For a detailed description of various embodiment of the invention, reference will now be made to the accompanying drawing, in which:

The FIGURE appended hereto illustrates the change in the viscosity during the step (E2) of the present invention.

DETAILED DESCRIPTION OF THE INVENTION

Various aspects of the invention and preferential embodiments are described in greater detail hereinafter.

The Latex L

The fluid latex L which is used in step (E1) to form the modified latex L' can be any dispersion of polymers P of the abovementioned type in a solvent medium, preferably an aqueous medium, in particular water or else a water/alcohol mixture. The viscosity of this latex L is, at a concentration of 10% by weight of polymer P, preferably less than 100 mPa·s, for example between 1 and 50 mPa·s.

It can typically be a latex obtained at the end of an emulsion polymerization.

The polymer P present in the latex L is typically a polymer comprising a backbone which is stable under the conditions of steps (E1) and (E2). In particular, it is generally a backbone not interrupted with bonds of which the chemical integrity can be degraded under the basic treatment conditions of steps (E1) and (E2). Typically, the polymer P present in the latex L used in step (E1) is a polymer resulting from a radical (preferably emulsion) polymerization of ethylenically unsaturated monomers, such as acrylates or methacrylates. It may be a homopolymer or else a copolymer. Copolymers are generally preferred since they make it possible to modulate the properties of the polymer. According to one advantageous embodiment, the polymer P is a random copolymer. Alternatively, the polymer P may be a block copolymer, for example a diblock or triblock. In the case of a block polymer, each of the blocks may be a homopolymer or else a random copolymer.

Characteristically, the polymer P present in the latex L used in step (E1) bears ester side (pendant) groups. Typically, these ester groups can be introduced into the polymer by preparing it from monomers consisting of or comprising acrylates corresponding to the formula $H_2C=COOR$, where R has the abovementioned definition, R preferably being an alkyl group comprising from 1 to 6 carbon atoms, in particular a methyl, ethyl, propyl, n-propyl, butyl, isobutyl or tert-butyl group.

According to one advantageous embodiment, the polymer P comprises ethyl ester —COO—$C_2H_5$, propyl ester —COO—$C_3H_7$ or butyl ester —COO$C_4H_9$ side functions, which advantageously result from the polymerization of ethyl, propyl or butyl acrylate monomers, respectively. According to another embodiment, the polymer P comprises ester side functions of ethanoate —O—(C=O)—$CH_3$, propanoate —O—(C=O)—$C_2H_5$, or butanoate —O—(C=O)—$C_3H_7$ type.

According to one particular embodiment, the polymer P bears ethyl ester —COO—$C_2H_5$ side functions, advantageously resulting from a polymerization of ethyl acrylate and more advantageously from a copolymerization of ethyl acrylates with other monomers.

In addition to ester groups, it is often advantageous for the polymer P to bear other types of functions, which are capable of conferring advantageous properties on said polymer.

According to one advantageous variant of the invention, the polymer P bears groups (hereinafter termed "stabilizing" groups) which allow stabilization of the latex L which makes it possible to store it for particularly prolonged periods or else facilitate its transportation without risk of the polymers settling out or creaming. They are typically hydrophilic groups. By way of stabilizing groups of this type, mention may be made, inter alia, of ionic or ionogenic side groups (sulfonate, carboxylic, zwitterionic side groups) typically introduced by ionogenic monomers (which make it possible to provide electrostatic repulsion between the particles of the latex) and hydrophilic neutral groups typically introduced by hydrophilic neutral monomers (which, for their part, provide steric stabilization. Preferably, the two types of stabilizations are combined to provide greater stability in a wide synthesis and/or formulation pH range. Advantageous stabilizing groups are sulfobetaine groups.

The ionogenic monomers can, inter alia, be chosen from: sulfonates (allyl sulfonate, methallyl sulfonate, AMPS, styrene sulfonate, allyloxyhydroxypropyl sulfonate), carboxylic monomers (acrylic acid, methacrylic acid, maleic acid, itaconic acid, sulfopropyl acrylate, sulfopropyl methacrylate, beta-carboxyethyl acrylate, acrylamidoglycolic acid, etc.), and zwitterionic monomers (SPE, SPP, SPV, carboxybetaine, etc).

The neutral monomers can in particular be chosen from: acrylamide, hydroxyethyl methacrylate, GMMA, methacrylamides, dimethylacrylamide, N-vinylpyrrolidone and PEG methacrylate.

The polymers P can also bear sulfate or phosphonate stabilizing groups. They can comprise vinylphosphonic acid monomers.

Alternatively, monomers of polymerizable surfactant type, such as Sipomer HPM 300 and 400 available from the company Rhodia, may be used.

The polymers P resulting from a copolymerization of alkyl (in particular ethyl) acrylates and of acrylates bearing stabilizing groups of the abovementioned type (in particular sulfobetaines) proved to be advantageous according to the invention. In particular, the copolymers of ethyl acrylate and of acrylamido of sulfobetaine type are very suitable for carrying out steps (E1) and (E2).

According to another variant (entirely compatible with the previous variant where the polymer bears stabilizing groups), the polymer P may bear hydrophobic groups (also hereinafter denoted "gelling" groups), which are suitable for accentuating the gelling phenomena in steps (E1) and (E2). These "gelling" groups can, for example, be hydrophobic groups resulting from the polymerization of non-hydrolyzable hydrophobic monomers such as styrene, N-dodecyl-methacrylamide or acrylates or methacrylates with very long hydrophobic chains (more than 6 carbons). These monomers can be introduced in low amounts (less than 10 mol % to 5 mol % depending on their nature) into the polymer and can induce a significant delay in gelling.

The abovementioned gelling groups are preferably stable under the conditions of steps (E1) and (E2). In particular, they are preferably groups that are inert with respect to the basic compound C under the temperature conditions of step (E2).

Typically, a polymer P according to the invention can typically comprise, as mol % relative to the amount of monomer units present on the polymer:
from 40% to 99.5% of monomer units bearing ester side groups (for example ethyl acrylate units),
from 0.5% to 10% of monomer units bearing stabilizing groups,
from 0 to 50% of monomer units bearing gelling groups.

Irrespective of the exact nature of the polymer P, its concentration within the latex L is preferably sufficient to obtain good gel stability at the end of step (E2). However, it is, moreover, preferable for this concentration to be sufficiently low for it to be possible for the gel formed in step (E2) to be subsequently eliminated by subjecting it to a sufficient mechanical stress. It should be noted in this respect that, usually, the method for producing the gel according to the invention is employed reversibly. Usually, at the end of step (E2), when the gel has been formed and has performed its role within the medium M (formation of a plug, for example), a step (E3) can be carried out, in which the gel formed at the end of step (E2) is eliminated (or evacuated), typically by subjecting this gel to a mechanical stress (in particular, placed under sufficient pressure).

Consequently, the concentration of polymer P in the latex L is to be adjusted on a case-by-case basis. However, typically, it usually proves to be advantageous for the concentration of polymer P within the latex L (expressed by the percentage ratio of the weight of polymer P present in the latex L, relative to the total weight of the latex L) to be as follows:
typically, in order to obtain a gel of sufficient strength, it is preferable for the concentration of polymer P in the latex L to be greater than or equal to 2%, more preferentially greater than or equal to 3%, or even greater than or equal to 5%;
typically, in order to provide an elimination of the gel after the gel has performed its role, it is preferable for the concentration of polymer P in the latex L to be less than or equal to 20%, more preferentially less than or equal to 15%, in particular less than or equal to 8%.

Moreover, the latex P is preferably a stable colloidal dispersion comprising particles of polymer P. The latex L typically comprises the polymer P in the form of dispersed particles (typically stable colloidal particles) generally having an average particle size that can range from 50 nm to a few microns, advantageously between 80 and 500 nm. The particle size to which reference is made in the present description corresponds to that as measured by light scattering, in particular using the Malvern Zetasizer.

In addition to the polymer P, the latex may optionally comprise additives, in particular surfactants suitable for stabilizing the latex.

According to one particular embodiment, the latex L is free of stabilizing additives other than the polymer P. In this case, the polymer P advantageously bears stabilizing groups of the abovementioned type.

According to one particular embodiment, the latex L essentially consists of polymers P dispersed within the solvent medium with less than 2% by weight, or even less than 1% of other compounds. According to one particular embodiment, the latex L exclusively consists of a dispersing medium (water or a water/alcohol mixture) and of polymer P bearing stabilizing groups.

The Basic Compound C

Any basic compound capable of hydrolyzing at least one part of the ester groups present on the polymer P can be used according to the invention.

A basic compound C which is very suitable according to the invention is sodium silicate. Alternatively, sodium hydroxide can be used.

The amount of compound C used is preferably such that it makes it possible to hydrolyze at least one part of the ester groups initially present on the polymer P. It is, however, preferable, in particular in order to obtain good gel strength, for the polymer to still bear hydrophobic groups at the end of the reaction with the compound C.

As a result, in particular when the polymer P does not bear hydrophobic "gelling" groups of the abovementioned type, the amount of compound C is preferably such that it allows the hydrolysis of only part of the ester functions (such that a part remains intact in order to ensure good gel strength). Typically, it is preferable for the compound C to be introduced in an amount which would theoretically make it possible to hydrolyze from 50% to 90% of the ester functions of the polymer P, preferably 60% to 80%, in particular about 75%. This amount of compound C can be higher and can be up to 100% or more when the polymer P bears stabilizing groups.

The formation of the gel according to the invention can be used for any application requiring the production of a gel that can be used at a temperature above 150° C. The gel can in particular be used to form a plug within an oil well or more generally to isolate a zone of an underground formation.

The gel can also be used in a porous rock formation to prevent undesirable arrivals of water or gas.

The invention will now be illustrated by the nonlimiting example given hereinafter.

EXAMPLE

1. Synthesis of a Latex Based on a Random Polymer Bearing Ester Groups (Ethyl Acrylate Units) and Sulfobetaine Groups The following are introduced, at ambient temperature (20° C.), into a 1-liter glass reactor equipped with a mechanical stirrer, with a reflux condenser, with a nitrogen inlet and with a jacket in which a heat-transfer fluid circulates:

9.6 g of 3-(dimethyl{3-[(2-methylacryloyl)amino]propyl}ammonio)propane-1-sulfonate
37.5 g of sodium lauryl sulfate
745.9 g of water.

The reaction medium was heated and maintained at 85° C.

At this temperature of 85° C., 0.39 g of sodium persulfate and 2 g of water were added to the medium.

15 min after this addition, the following were gradually and simultaneously added over a period of 4 h:
325.4 g of ethyl acrylate; and
a mixture of 1.17 g of persulfate and 20 g of water.

30 minutes after the end of these additions, 0.77 g of tert-butyl peroxybenzoate was introduced, then, 15 minutes later, a solution of 0.35 g of L-ascorbic acid and 20 g of water were gradually introduced over a period of one hour.

A stable fluid latex, the particle size of which, measured on a Zetasizer, is 300 nm, was thus obtained.

2. Basic Hydrolysis of the Latex using Sodium Silicate and Gradual Formation of the Gel Formulation with Sodium Silicate (E1)

The latex obtained according to example 1 is diluted to a concentration of 10% of active polymer with an aqueous solution of potassium chloride at 20 g/l.

Added to this fluid dispersion are 15 g of liquid sodium silicate (aqueous solution of 28.6% of $SiO_2$, 8.6% of $Na_2O$) for 100 g of latex solution. The amount of silicate used here makes it possible, for a total conversion of the hydrolysis reaction, to achieve a degree of hydrolysis of the latex of 53%.

Monitoring of the Hydrolysis by Rheology (E2)

This solution containing the latex and the silicate is fluid and stable at ambient temperature. The viscosity is 1 to 2 mPa·s.

15 ml of this solution are placed in the B01 Couette cell of a Brookfield PVS rheometer (supplied by Brookfield Engineering Laboratories Inc.) previously calibrated with 500 mPa·s standard silicone oil.

The viscosity is monitored during a temperature ramp of 2 h from 20° C. to 200° C., then of 2 h from 200° C. to 20° C. During the temperature increase ramp, the viscosity remains less than 100 mPa·s up to a temperature of 170° C. The viscosity then increases rapidly for a temperature above 170° C. This increase is representative of the hydrolysis and gelling of the mixture.

During the descending temperature ramp, it is confirmed that the gelling is irreversible since, once heated above 180° C., the viscosity of the mixture remains high. The FIGURE appended hereto illustrates the change in the viscosity during step (E2).

Stability of the Gel with Respect to Storage at High Temperature

The mixture resulting from step (E1) described above is diluted to various concentrations of polymer P with a solution of potassium chloride at 20 g/l. 50 ml of these various solutions are placed in pressurized Teflon cells (acid digestion vessel model 4748 Large Capacity, supplied by Parr Instrument Co.) and placed in an oven preheated to 200° C.

After various times, the cells are cooled to ambient temperature and the gels obtained are analyzed by rheology on an AR2000 rheometer supplied by TA Instruments, by means of a grooved plate/plate geometry (diameter 40 mm, 1 mm gap). The elastic moduli measured at a temperature of 90° C. are reported in the table below.

| Cp (% by weight) | G' (kPa at 1% deformation at 90° C.) | | | Observation: |
| --- | --- | --- | --- | --- |
| | 1 day | 4 days | 7 days | |
| 2.5 | 0.047 | | | considerable syneresis |
| 5 | 1.2 | 4.4 | 9.8 | slight syneresis |
| 7.5 | 4.9 | 8.6 | 14.2 | homogeneous white gel |
| 10 | 4.6 | 26.2 | 50 | homogeneous white gel |

3. Basic Hydrolysis of the Latex using Sodium Hydroxide and Gradual Formation of the Gel Formulation with Sodium Hydroxide (E1)

The latex obtained according to example 1 is diluted to a concentration of 10% of active polymer with an aqueous solution of potassium chloride at 20 g/l.

Added to this fluid dispersion are 7.5 g of sodium hydroxide (NaOH in aqueous solution at 30% by weight) for 100 g of latex solution. The amount of sodium hydroxide used here makes it possible, for a total conversion of the hydrolysis reaction, to achieve a degree of hydrolysis of the latex of 31%.

Monitoring of the Hydrolysis by Rheology (E2)

This solution containing the latex and the silicate is fluid and stable at ambient temperature. The viscosity is 1 to 2 mPa·s.

15 ml of this solution are placed in the B01 Couette cell of a Brookfield PVS rheometer (supplied by Brookfield Engineering Laboratories Inc.) previously calibrated with 500 mPa·s standard silicone oil.

The viscosity is monitored during a temperature ramp of 2 h from 20° C. to 200° C., then of 2 h from 200° C. to 20° C. During the temperature increase ramp, the viscosity remains less than 100 mPa·s up to a temperature of 110° C. The viscosity then increases rapidly for a temperature above 110° C. This increase is representative of the hydrolysis and gelling of the mixture.

During the descending temperature ramp, it is confirmed that the gelling is irreversible since, once heated above 150° C., the viscosity of the mixture remains high. The table hereinafter illustrates the change in the viscosity during step (E2).

| temperature (° C.) | viscosity (mPa · s) |
|---|---|
| 30 | 1 |
| 50 | 3.1 |
| 70 | 3.7 |
| 90 | 6.5 |
| 110 | 7.3 |
| 130 | 860 |
| 150 | 1570 |
| 170 | 1360 |
| 190 | 910 |
| 170 | 1230 |
| 150 | 1380 |
| 130 | 1430 |
| 110 | 1390 |
| 90 | 1310 |
| 70 | 1220 |
| 50 | 1170 |
| 30 | 1160 |

Stability of the Gel with Respect to Storage at High Temperature

The mixture resulting from step (E1) described above is divided up into samples of 50 ml in pressurized Teflon cells (acid digestion vessel model 4748 Large Capacity, supplied by Parr Instrument Co.) and placed in an oven preheated to 200° C.

After various times, the cells are cooled to ambient temperature and the gels obtained are analyzed by rheology on an AR2000 rheometer supplied by TA Instruments, by means of a grooved plate/plate geometry (diameter 40 mm, 1 mm gap). The elastic moduli measured at a temperature of 90° C. are reported in the table below.

| G' (Pa at 1% déformation at 90° C.) | | | |
|---|---|---|---|
| 1 day | 3 days | 6 days | Observation: |
| 70 | 63 | 24 | transparent gel |

The invention claimed is:

1. A process for forming a gel within a medium M comprises the following steps:
    (E1) adding a basic compound C to a fluid latex L comprising dispersed particles of a polymer P, bearing ester side functions and stabilizing hydrophilic groups which allow stabilization of the latex L, wherein the concentration of polymer P in the latex L is greater than or equal to 7.5% greater than or equal to 5% and less than or equal to 8% by weight,
    the polymer P comprising, as mol % relative to the amount of monomer units present on the polymer:
    from 40% to 99.5% of monomer units bearing ester side groups, and
    from 0.5% to 10% of monomer units bearing stabilizing hydrophilic groups;
    said basic compound C being added in an amount suitable for hydrolyzing at least one of said ester side functions into carboxylic acid and/or alcohol functions, as a result of which a modified latex L' is obtained, the viscosity of which gradually increases with time from the addition of the compound C up to the formation of a gel; then
    (E2) introducing the resulting modified latex into the medium M before the formation of the gel and the gel is left to form within the medium M, wherein the medium M is an underground formation.

2. The process as claimed in claim 1, wherein:
    all or part of step (E2) is carried out at a temperature above or equal to 150° C., and/or
    the gel formed in step (E2) is used at a temperature above or equal to 150° C.

3. The process as claimed in claim 2, wherein the basic compound is added to the fluid latex just before injection into the underground formation, wherein the polymer P bearing ester side functions comprises:
    (i) a backbone not interrupted with ester functions; and
    (ii) borne by this backbone, identical or distinct ester functions, of formula —COOR and/or -0-(C=0)-R, where each of the R groups on each of the ester functions present on the polymer is, independently, a totally or partially cyclic or noncyclic, saturated or unsaturated, linear or branched hydrocarbon-based chain optionally interrupted with one or more heteroatoms (in particular S, O, N or Si), wherein the R group is optionally halogenated, or perhalogenated,
    wherein the gel produced reversibly forms a plug within a cavity within the medium M, the gel plugging the cavity for at least seven days at a temperature of at least 150° C.; and then
    removing the gel by applying thereto a sufficient mechanical stress, base, acid or oxidizing agent, the applying of the mechanical stress comprises applying pressure.

4. The process as claimed in claim 3, wherein the R group is an alkyl group comprising from 1 to 6 carbon atoms.

5. The process as claimed in claim 1, wherein the polymer P is prepared from monomers comprising acrylates corresponding to the formula $CH_2$=COOR, where R is, independently, the totally or partially cyclic or noncyclic, saturated or unsaturated, linear or branched hydrocarbon-based chain optionally interrupted with one or more heteroatoms, wherein the R group is optionally halogenated or perhalogenated.

6. The process as claimed in claim 5, where R being an alkyl group comprising from 1 to 6 carbon atoms.

7. The process as claimed in claim 5, wherein the heteroatoms are selected from the group consisting of S, O, N and Si.

8. The process as claimed in claim 1, wherein the polymer P comprises ethyl ester —COO—$C_2H_5$, propyl ester —COO—$C_3H_7$ or butyl ester —COO$C_4H_9$ side functions.

9. The process as claimed in claim 1, wherein the polymer P bears ethyl ester —COO—$C_2H_5$ side functions, resulting from a polymerization of ethyl acrylate.

10. The process as claimed in claim 1, wherein the polymer P bears ethyl ester —COO—$C_2H_5$ side functions, resulting from a copolymerization of ethyl acrylates with other monomers.

11. The process as claimed in claim 1, wherein the stabilizing groups are sulfobetaine groups.

12. The process as claimed in claim 1, wherein the polymer P bears hydrophobic groups suitable for accentuating the gelling phenomena in steps (E1) and (E2).

13. The process as claimed in claim 12, wherein the hydrophobic groups suitable for accentuating the gelling phenomena in steps (E1) and (E2) result from polymerization of non-hydrolyzable hydrophobic monomers selected from the group consisting of styrene, N-dodecylmethacrylamide, acrylates and methacrylates with hydrophobic chains having more than 6 carbons, these monomers being present in a range having an upper limit of at most less than 10 mol % and a lower limit of at least 5 mol % of the polymer;

wherein the polymer comprises from 40 to 99.5 mol % monomer units bearing the ester side groups, 0.5 to 10 mol % monomer units bearing stabilizing groups, and 0 to 50 mol % monomer units bearing gelling groups.

14. The process as claimed in claim 1, wherein the gel produced reversibly forms a plug within said underground formation.

15. The process as claimed in claim 14, wherein the underground formation is an oil well.

16. The process as claimed in claim 1, wherein:

all or part of step (E2) is carried out at a temperature above 200° C., and/or the gel formed in step (E2) is used at a temperature above 200° C.

17. The process as claimed in claim 1, wherein the stabilizing groups comprise at least one ionogenic side group selected from the group consisting of sulfonate, carboxylic and zwitterionic groups introduced by inorganic monomers, and at least one hydrophilic neutral group introduced by hydrophilic neutral monomers;

wherein the ionogenic monomer for the sulfonate side group is selected from the group consisting of allyl sulfonate, methallyl sulfonate, AMPS (2-acrylamido-2-methylpropane-sulfonic acid), styrene sulfonate and allyloxyhydroxypropyl sulfonate, the ionogenic monomer for the carboxylic side group is selected from the group consisting of acrylic acid, methacrylic acid, maleic acid, itaconic acid, sulfopropyl acrylate, sulfopropyl methacrylate, beta-carboxyethyl acrylate and acrylamidoglycolic acid, and the ionogenic monomer for the zwitterionic side group is selected from the group consisting of SPE (sulphopropyldimethylammonioethyl methacrylate), SPP (sulphopropyldimethylammoniopropylmethacrylamide), SPV (2-vinyl-1-(3-sulphopropyl)pyridinium betaine) and carboxybetaine;

wherein the monomer for the neutral side group is selected from the group consisting of acrylamide, hydroxyethyl methacrylate, GMMA (glycerol monomethacrylate), methacrylamides, dimethylacrylamide, N-vinylpyrrolidone and PEG (polyethylene glycol) methacrylate.

18. The process as claimed in claim 1, wherein the stabilizing groups comprise at least one side group selected from the group consisting of carboxylic, sulphates, phosphonates and vinylphosphonic acid monomers, and at least one hydrophilic neutral group introduced by hydrophilic neutral monomers;

wherein the monomer for the carboxylic side group is selected from the group consisting of acrylic acid, methacrylic acid, maleic acid, itaconic acid, sulfopropyl acrylate, sulfopropyl methacrylate, beta-carboxyethyl acrylate and acrylamidoglycolic acid;

wherein the monomer for the neutral side group is selected from the group consisting of: acrylamide, hydroxyethyl methacrylate, GMMA (glycerol monomethacrylate), methacrylamides, dimethylacrylamide, N-vinylpyrrolidone and PEG (polyethylene glycol) methacrylate.

19. The process as claimed in claim 1, wherein the stabilizing hydrophilic groups comprise ionic or ionogenic groups and/or neutral groups.

20. The process as claimed in claim 1, wherein the dispersed particles of polymer P have an average particle size between 80 and 500 nm.

21. The process as claimed in claim 1, wherein the basic compound C is sodium hydroxide.

22. A kit for carrying out the process of claim 1, which comprises:

at least one first container containing a fluid latex L as defined in claim 1; and at least one second container, distinct from the first, containing a basic compound C as defined in claim 1, to be added to the latex L so as to form the modified latex L' for the formation of a gel according to step (E2).

* * * * *